United States Patent Office.

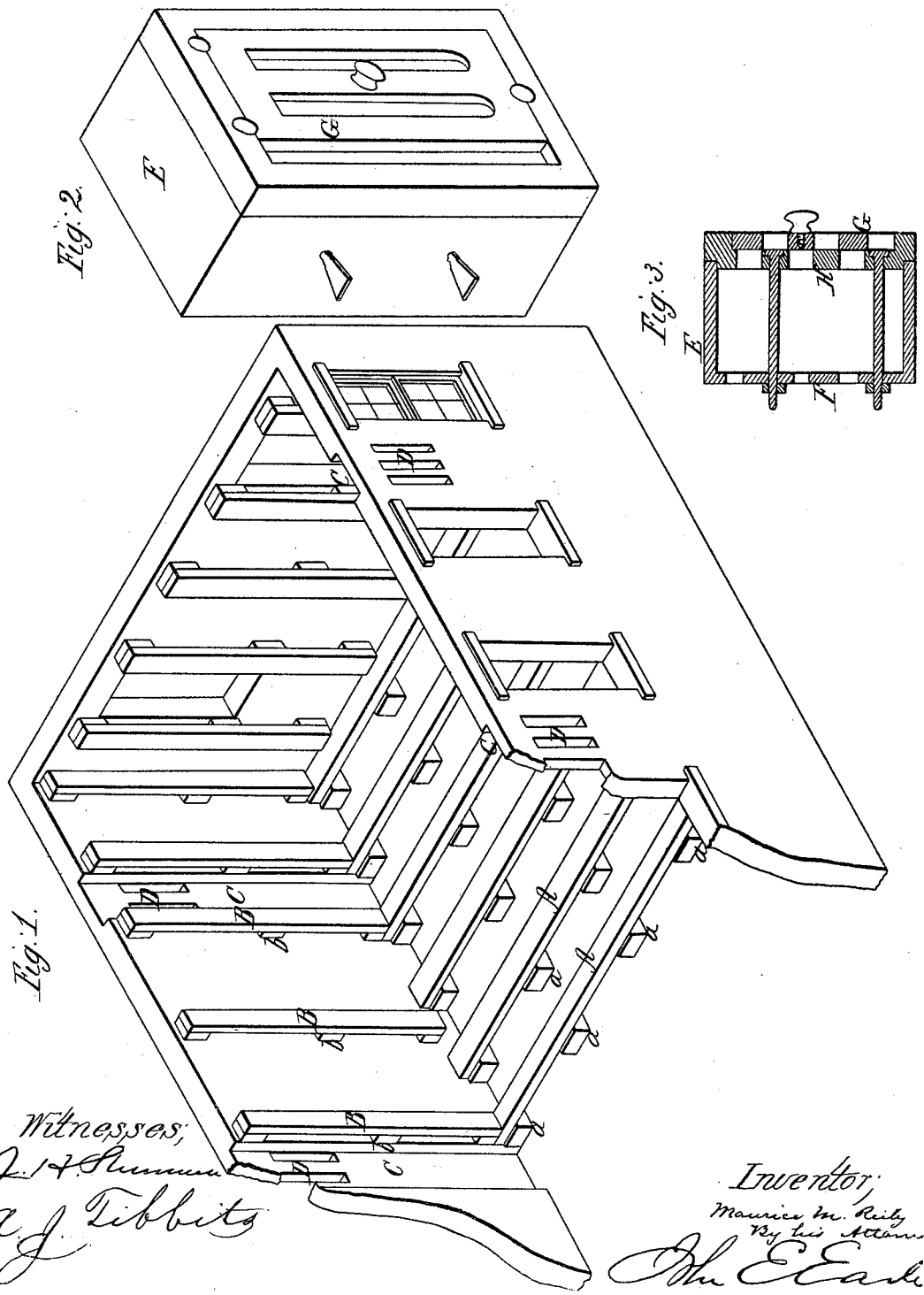

MAURICE M. REILY, OF NEW HAVEN, CONNECTICUT.

Letters Patent No. 90,580, dated May 25, 1869.

VENTILATOR.

The Schedule referred to in these Letters Patent and making part of the same.

*To all whom it may concern:*

Be it known that I, MAURICE M. REILY, of New Haven, in the county of New Haven, and State of Connecticut, have invented a new Improvement in Ventilating Basements of Buildings; and I do hereby declare the following, when taken in connection with the accompanying drawings, and the letters of reference marked thereon, to be a full, clear, and exact description of the same, and which said drawings constitute part of this specification, and represent, in—

Figure 1, a section of the wall and flooring of a basement, illustrating the process of ventilation;

Figure 2, a perspective view of the ventilator; and in

Figure 3, a transverse section of the same.

The object of this invention is to ventilate the space between the walls and lining, and beneath the flooring of the basement of buildings. To this end, The invention consists in the arrangement of the flooring-timbers, and the furrings on the walls, so that a connected communication exists over the whole of the walls, and beneath the floor, and this space communicating to the flues, into which air is admitted above the ground, so as to create a draught in the flues, to cause a circulation beneath the flooring-timbers, and in the space between the walls and the flooring.

In order to the clear understanding of my invention, I will fully describe the same as illustrated in the accompanying drawings.

In placing the flooring A, I arrange it upon bearings *a*, so that a communication will be had over the whole space beneath the flooring; and the furring B, on the wall, I arrange in similar manner upon bearings *b*, so as to leave a space communicating over the whole of the walls, and beneath the floors; and at convenient points, C, in the wall, I form flues, into which the open space beneath the floors and the walls communicates; then, in the walls above the surface of the ground, I arrange ventilators D, communicating with, and so as to admit air from the outside into the flues, so that, when the walls are covered and the floors laid, a perfect circulation, and, consequently, thorough ventilation will be maintained within the walls and beneath the floor, preventing the usual dampness in basement-rooms.

The ventilator which I use, is shown in figs. 3 and 2, and consists in a box, *e*, formed with a net-work, *f*, upon the inside, with an open sliding plate, G, upon the outside, working over a plate, H, the openings in the fixed plate corresponding to the openings in the sliding plate, so that the flues may be closed or opened upon the outside, to regulate the draught in the flues.

Having fully described my invention,

What I claim as new and useful, and desire to secure by Letters Patent, is—

In the basement of buildings, forming a communication beneath the floors and around the walls, to flues, constructed so as to admit external air, for the purpose of ventilation, substantially as set forth.

MAURICE M. REILY.

Witnesses:
J. H. SHUMWAY,
A. J. TIBBITS.